United States Patent
Inaguchi

(10) Patent No.: US 10,384,320 B2
(45) Date of Patent: Aug. 20, 2019

(54) POSITION COMPENSATION SYSTEM AND POSITION COMPENSATION METHOD FOR TOOL CHANGER

(71) Applicant: FANUC CORPORATION, Yamanashi (JP)

(72) Inventor: Yuuzou Inaguchi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 82 days.

(21) Appl. No.: 15/694,025

(22) Filed: Sep. 1, 2017

(65) Prior Publication Data

US 2018/0065220 A1 Mar. 8, 2018

(30) Foreign Application Priority Data

Sep. 6, 2016 (JP) .................................. 2016-173809

(51) Int. Cl.
*B23Q 3/157* (2006.01)
*G05B 19/404* (2006.01)
*B23Q 3/155* (2006.01)

(52) U.S. Cl.
CPC ...... *B23Q 3/15503* (2016.11); *B23Q 3/15534* (2016.11); *B23Q 3/15706* (2013.01); *G05B 19/404* (2013.01); *G05B 2219/49171* (2013.01); *G05B 2219/50242* (2013.01); *G05B 2219/50256* (2013.01); *Y10T 483/12* (2015.01); *Y10T 483/138* (2015.01); *Y10T 483/14* (2015.01); *Y10T 483/1795* (2015.01)

(58) Field of Classification Search
CPC .......... Y10T 483/12–15; G05B 19/404; G05B 2219/50242; B23Q 3/155–15793

USPC ................................ 483/4–13; 700/179, 193
See application file for complete search history.

(56) References Cited

U.S. PATENT DOCUMENTS 6,471,451 B2 * 10/2002 Kojima ................ G05B 19/404
   318/471
10,189,129 B2 * 1/2019 Isobe ................. B23Q 3/15706
(Continued)

FOREIGN PATENT DOCUMENTS

EP      2913147 A1    9/2015
JP      415807 A      1/1992
(Continued)

OTHER PUBLICATIONS

English Abstract for Japanese Publication No. 2015-139842 A, published Aug. 3, 2015, 1 pg.
(Continued)

*Primary Examiner* — Erica E Cadugan
(74) *Attorney, Agent, or Firm* — Fredrikson & Byron, P.A.

(57) ABSTRACT

A position compensation system of a tool changer includes a storage unit for storing a coordinate indicating a reference position of a turret, a rotary position coordinate detector for detecting the rotary position coordinate of the turret, a compensation necessity determiner for determining whether or not it is necessary to perform a rotational compensation to return the turret to the reference position, in accordance with a rotational deviation of the detected rotary position coordinate from the stored rotary position coordinate, and a compensation request part for requesting an operation or work related to the rotational compensation when it is determined that the rotational compensation needs to be performed.

7 Claims, 8 Drawing Sheets

(56) References Cited

U.S. PATENT DOCUMENTS

| | | | |
|---|---|---|---|
| 2015/0209924 A1 | | 7/2015 | Murota et al. |
| 2019/0009382 A1* | | 1/2019 | Inaguchi .............. B23Q 16/065 |
| 2019/0030668 A1* | | 1/2019 | Maki ..................... B23Q 17/00 |

FOREIGN PATENT DOCUMENTS

| | | | |
|---|---|---|---|
| JP | 6155232 A | 6/1994 |
| JP | 8108336 A | 4/1996 |
| JP | 20005978 A | 1/2000 |
| JP | 201099799 A | 5/2010 |
| JP | 2011173197 A | 9/2011 |
| JP | 2013254319 A | 12/2013 |
| JP | 2015139842 A | 8/2015 |
| WO | 2014062010 A1 | 4/2014 |

OTHER PUBLICATIONS

English Abstract and Machine Translation for Japanese Publication No. 2011-173197 A, published Sep. 8, 2011, 14 pgs.

English Abstract and Machine Translation for Japanese Publication No. 2010099799 A, published May 6, 2010, 8 pgs.

English Abstract and Machine Translation for Japanese Publication No. 08-108336 A, published Apr. 30, 1996, 9 pgs.

English Abstract and Machine Translation for Japanese Publication No. 2000-005978 A, published Jan. 11, 2000, 11 pgs.

English Abstract and Machine Translation for International Publication No. 2014/062010 A1, published Apr. 24, 2014, 16 pgs.

English Abstract and Machine Translation for Japanese Publication No. 04-015807 A, published Jan. 21, 1992, 7 pgs.

English Abstract and Machine Translation for Japanese Publication No. 2013-254319 A, published Dec. 19, 2013, 15 pgs.

English Abstract and Machine Translation for Japanese Publication No. 06-155232 A, published Jun. 3, 1994, 9 pgs.

English Translation of JP Decision to Grant dated Aug. 7, 2018 for Japanese Application No. 2016-173809, 3 pgs.

Untranslated JP Decision to Grant dated Aug. 7, 2018 for Japanese Application No. 2016-173809, 3 pgs.

\* cited by examiner

POSITION COMPENSATION SYSTEM AND POSITION COMPENSATION METHOD FOR TOOL CHANGER

CROSS-REFERENCE TO RELATED APPLICATION

This application is based upon and claims the benefit of priority from Japanese Patent Application No. 2016-173809 filed on Sep. 6, 2016, the contents of which are incorporated herein by reference.

BACKGROUND OF THE INVENTION

Field of the Invention

The present invention relates to a position compensation system and a position compensation method for compensating the position of a tool changer in a machine tool having a so-called turret type tool changer.

Description of the Related Art

Conventionally, tool changers capable of automatically replacing tools to be mounted on a spindle of a machine tool have known. As one configuration of tool changing devices, a so-called "turret system" can be mentioned in which a turret type magazine (hereinafter simply referred to as a turret) with multiple grips capable of holding tools arranged in the circumferential direction is turned so as to realize automatic change of tools. As to this turret system, a technique for suppressing positional deviation (axial misalignment) that could occur between the spindle and the grip has been proposed.

Japanese Laid-Open Patent Publication No. 2011-173197 ([0014] to [0020]) has proposed a machine tool which, based on the driving state of a servomotor (rotary driver) for rotating a turret, detects a positional deviation occurring between the spindle (main shaft) and the grip to thereby compensate the positional deviation as necessary. More detailedly, the disclosure describes that the load of the rotary driver is detected when a tool is pulled out from, or attached to, the spindle.

SUMMARY OF THE INVENTION

When the weight distribution of multiple tools held on the turret is imbalance, there occurs a case where the turret turns in such a direction as to lower the center of gravity due to some unexpected force acting on the rotary driver. When not a negligible rotational deviation occurs for the above reason, the timing of detection (at the time of insertion/removal of a tool) proposed at Japanese Laid-Open Patent Publication No. 2011-173197 causes problems such as failures in changing tools or giving impacts on the spindle.

As a countermeasure to solve this problem, it is conceivable to provide a brake mechanism for applying mechanical braking force to the turret or rotary driver. However, addition of this braking mechanism gives rise to such problems as to complicate the machine structure for that and increase the manufacturing cost of the whole system.

The present invention has been devised to solve the above-described problems, it is therefore an object of the present invention to provide a position compensation system and a position compensation method capable of setting a tool changer within a suitable positional range without the need of providing an extra braking mechanism that prevents occurrence of a rotational deviation even if the turret is caused to shift rotationally due to some unspecified action on the rotary driver.

A position compensation system according to the first aspect of the present invention resides in a position compensation system of a tool changer including a turret in which a plurality of grips capable of holding tools to be attached to a spindle of a machine tool are arranged along a circumferential direction, and a rotary driver that rotationally drives the turret about a rotary shaft to index an arbitrary one of the grips, and includes: a storage unit configured to store a rotary position coordinate of the turret corresponding to an index position of the grip as a coordinate representing a reference position of the turret; a rotary position coordinate detector configured to detect the rotary position coordinate of the turret; a compensation necessity determiner configured to determine whether or not it is necessary to perform a rotational compensation to return the turret to the reference position, in accordance with a rotational deviation of the rotary position coordinate of the turret detected by the rotary position coordinate detector from the rotary position coordinate of the turret stored in the storage unit; and a compensation request part configured to request an operation or work related to the rotational compensation when the compensation necessity determiner determines that the rotational compensation needs to be performed.

In the above way, whether or not it is necessary to perform a rotational compensation to return the turret to the reference position, in accordance with a rotational deviation of the detected rotary position coordinate from the stored rotary position coordinate is determined. It is therefore possible to always set the turret at a suitable rotary position after starting or restarting the operation of the tool changer including the turret driver, regardless of whether or not the turret has actually turned in the direction of lowering the center of gravity. As a result, even if some action has exerted on the turret driver to cause a rotational deviation on the turret, it is possible to set the tool changer within a suitable positional range without use of an extra braking mechanism to prevent the rotational deviation.

The above-described position compensation system according to the first aspect of the present invention, may further include a power status determiner configured to determine an on-state or an off-state of power supply to the rotary driver operated by electric power and may be constructed such that the compensation necessity determiner is configured to determine whether or not it is necessary to perform a rotational compensation when the power status determiner determines that power supply has been switched from the off-state to the on-state. This configuration is especially effective because the turret becomes more likely to turn by being triggered by suspension of power supply to the turret driver.

In the above-described position compensation system according to the first aspect of the present invention, the compensation request part may be a compensation commanding part configured to instruct the rotary driver to perform an operation of returning the turret to the reference position. This configuration makes it possible to eliminate the rotational deviation of the turret by automatic rotational compensation.

In the above-described position compensation system according to the first aspect of the present invention, the compensation request part may be a notifier configured to notify an operator to perform the work of returning the turret to the reference position. This configuration makes it possible to eliminate the rotational deviation of the turret by manual rotational compensation.

In the above-described position compensation system according to the first aspect of the present invention, the compensation necessity determiner may be configured to determine that the rotational compensation is unnecessary when magnitude of the rotational deviation is less than a threshold and that the rotational compensation needs to be done when the magnitude of the rotational deviation is equal to or greater than the threshold. This configuration makes it possible to always set the rotational deviation of the turret smaller than a given allowance (that is, the threshold).

Further, in the above-described position compensation system according to the first aspect of the present invention, the compensation request part may be configured to function as a compensation commanding part that instructs the rotary driver to perform the operation of returning the turret to the reference position and a notifier that notifies an operator to perform the work of returning the turret to the reference position, and the compensation necessity determiner may be configured to determine that the rotational compensation is unnecessary when magnitude of the rotational deviation is less than a first threshold, that the rotational compensation accompanied by a notification from the notifier is necessary when the magnitude of the rotational deviation is equal to or greater than a second threshold that is greater than the first threshold and that the rotational compensation accompanied by a command from the compensation commanding part is necessary when the magnitude of the rotational deviation is equal to or greater than the first threshold and less than the second threshold. Thus, use of different methods, either automatic compensation or manual compensation depending on the magnitude of the rotational deviation of the turret, makes it possible to achieve flexible rotational compensation.

A position compensation method according to the second aspect of the present invention is a position compensation method for a tool changer including a turret in which a plurality of grips capable of holding tools to be attached to a spindle of a machine tool are arranged along a circumferential direction, and a rotary driver that rotationally drives the turret about a rotary shaft to index an arbitrary one of the grips, and comprises: a storing step of storing a rotary position coordinate of the turret corresponding to an index position of the grip as a coordinate representing a reference position of the turret; a detecting step of detecting the rotary position coordinate of the turret; a determining step of determining whether or not it is necessary to perform a rotational compensation to return the turret to the reference position, in accordance with a rotational deviation of the detected rotary position coordinate of the turret from the stored rotary position coordinate of the turret; and a requesting step of requesting an operation or work related to the rotational compensation when it is determined that the rotational compensation needs to be performed.

According to the position compensation system and position compensation method for a tool changer of the present invention, even if some action has exerted on the turret driver to cause a rotational deviation on the turret, it is possible to set the tool changer within a suitable positional range without use of an extra braking mechanism to prevent the rotational deviation.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Referring next to the accompanying drawings, preferred embodiments of the position compensating system of a tool changer according to the present invention will be described in association with a position compensation method of the tool changer.

First Embodiment

To begin with, a position compensation system (also referred to simply as "position compensation system" hereinbelow) of a tool changer in the first embodiment will be described with reference to FIGS. 1 to 4.

<Configuration of Machine Tool System 10>

Figure 1:
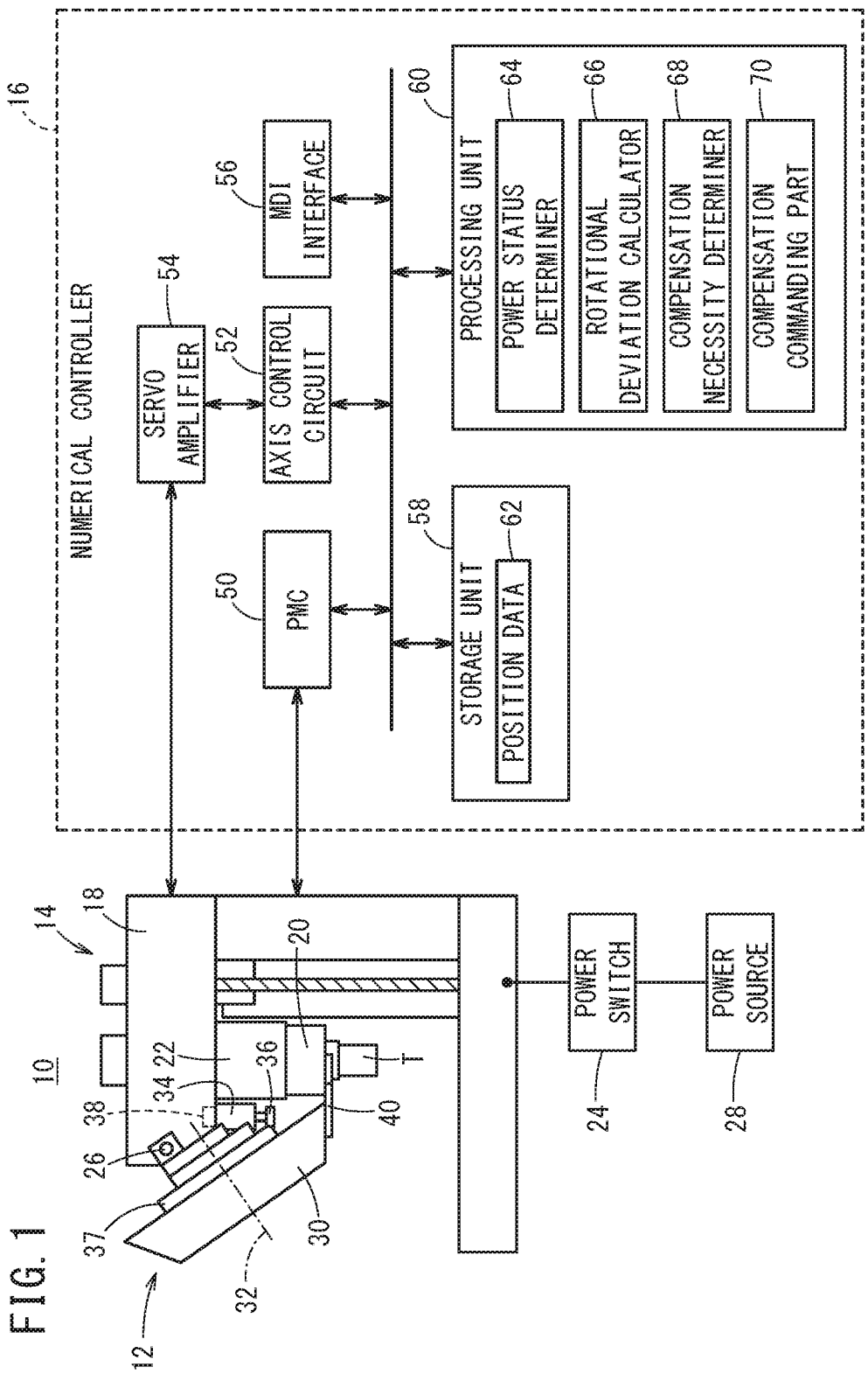
FIG. 1 is an overall configuration diagram of a machine tool system as a position compensation system in the first embodiment of the present invention.

FIG. 1 is an overall configuration diagram of a machine tool system 10 as a position compensation system in the first embodiment of the present invention. The machine tool system 10 includes a machine tool 14 having a tool changer 12 and a numerical controller 16 for controlling the machine tool 14 using a machining or cutting program. The machine tool 14 is an apparatus for performing desired machining (for example, milling, cutting, drilling, boring) on an unillustrated workpiece.

The machine tool 14 includes a main machine body 18, a spindle head 22 having a spindle 20, a power switch 24 and a pivot support 26. When the power switch 24 is in the on-state, electric power is supplied from a power source 28 to the machine tool 14 while when the power switch 24 is in the off-state, the supply of power from the power source 28 to the machine tool 14 is stopped.

The pivot support 26 pivotally supports the tool changer 12 relative to the main machine body 18. The tool changer 12 is moved to a position close to the spindle head 22 when a tool T is exchanged while the tool changer 12 is moved to a position away from the spindle head 22 at times other than replacement. This makes it possible to secure a wide working space at the time of machining a workpiece.

The tool changer 12 includes a turret 30 capable of holding a plurality of tools T, a turret driving motor 34

(rotary driver/position compensator) for turning and driving the turret 30 around a rotary shaft 32 and a turret side gear 37 capable of meshing a gear (which will be referred to hereinbelow as a motor side gear) 36 of the turret driving motor 34.

The turret driving motor 34 is composed of, for example, an electric servomotor operated by electric power, and is fixed at a predetermined position of the main machine body 18. When the tool changer 12 is at a position close to the spindle head 22, the motor side gear 36 and the turret side gear 37 mesh with each other so that the turret 30 can be rotated by the turret driving motor 34.

The turret driving motor 34 is configured to include an encoder (rotary position coordinate detector) 38 capable of detecting a rotary position coordinate (herein, absolute position) and outputs a signal indicating the detected rotary position coordinate to the numerical controller 16 (specifically, an aftermentioned servo amplifier 54).

The numerical controller 16 is a computer including a PMC (Programmable Machine Controller) 50, an axis control circuit 52, the servo amplifier 54, an MDI (Manual Data Input) operation unit 56, a storage unit 58, and a processing unit 60.

The PMC 50 runs a ladder program or the like to implement desired sequence control on the machine tool 14. The axis control circuit 52 is an electric circuit for performing multi-axis control on the machine tool 14. The servo amplifier 54 is a driver for driving multiple drive motors including the turret driving motor 34 to drive the turret driving motor 34 so that the rotary position of the turret 30 coincides with the command position given from the axis control circuit 52.

The MDI interface 56 is composed of, for example, input/output devices including a keyboard, mouse, touch sensor, display and speaker, and is configured to be able to input and output multiple forms of driving information relating to the operation of the machine tool system 10.

The storage unit 58 is composed of at least one volatile or nonvolatile memory device. The memory device is composed of, for example, a ROM (Read Only Memory), RAM (Random Access Memory), PROM (Programmable ROM), EEPROM (Electrically Erasable Programmable ROM), flash memory and the like. In the illustrated example, stored in the storage unit 58 is position data 62 representing a reference position Pr (see FIGS. 2A to 3B), in addition to an unillustrated startup program and machining program).

The processing unit 60 is configured of a processor such as a CPU (Central Processing Unit) or MPU (Micro-Processing Unit). The processing unit 60 reads out the program from the storage unit 58 and runs the program to thereby enable execution of the individual functions of a power status determiner 64, a rotational deviation calculator 66, a compensation necessity determiner 68, and a compensation commanding part 70.

<Specific Structure of Turret 30>

Subsequently, a specific configuration of the turret 30 that holds multiple tools T will be described with reference to FIGS. 2A to 3B. Hereinafter, when each of multiple tools T is clearly distinguished, the tools are represented separately as T1, T2, T3, T4 (when there are four tools).

Figure 2A:
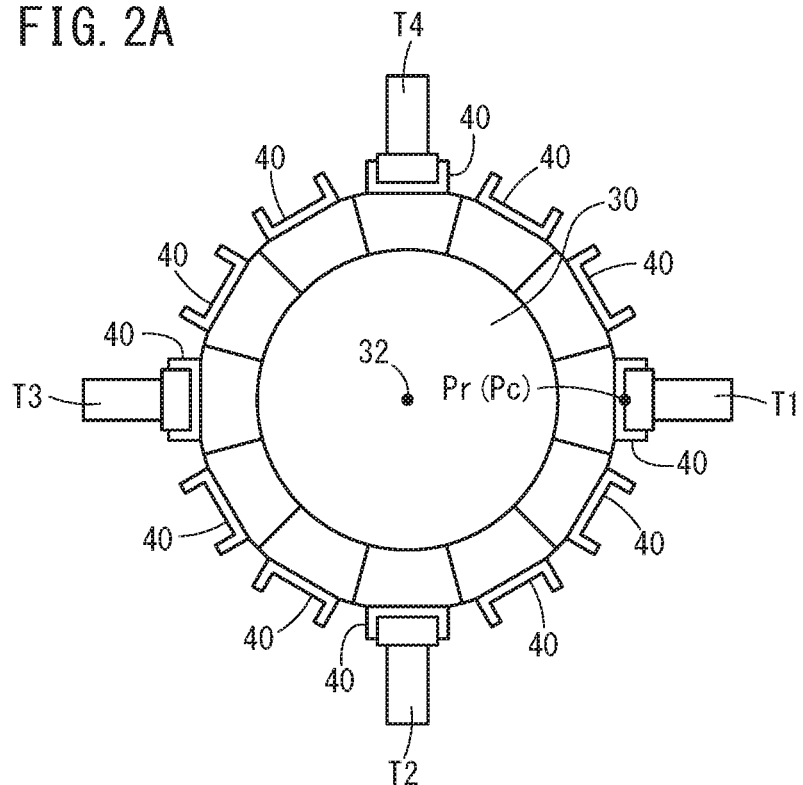
FIGS. 2A and 2B are diagrams showing a first transition of a temporal change in the rotary position of a turret.
Figure 2B:
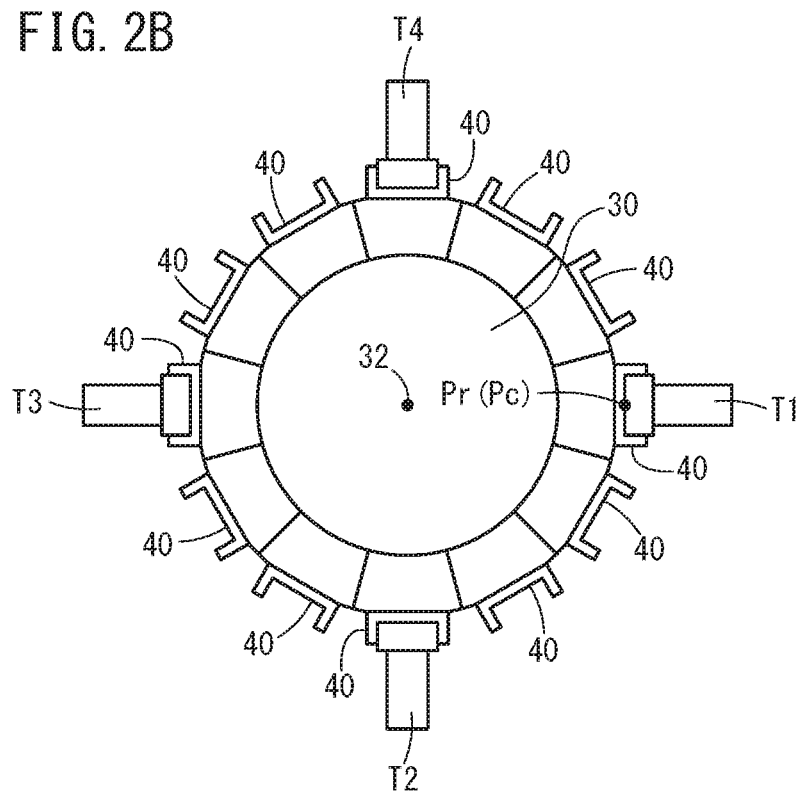

FIGS. 2A and 2B are diagrams showing a first transition of a temporal change in the rotary position of the turret 30. More specifically, FIG. 2A shows the rotary position of the turret 30 with the power switch 24 (FIG. 1) in the on-state. FIG. 2B shows the rotary position of the turret 30 immediately after turning off the power switch 24 (FIG. 1) from the positional state shown in FIG. 2A.

A plurality of grips (tool holders) 40 capable of holding tools T one by one are provided on the approximately disc-shaped turret 30. In the example of this drawing, twelve grips 40 are arranged at equiangular intervals along the circumferential direction of the turret 30 (specifically, at intervals of 30 degrees). Hereinafter, it is assumed that four of the twelve grips 40 hold tools having the same weight (hereinafter, four tools T1, T2, T3, T4).

Storage unit 58 (FIG. 1) stores the number of the index position of each grip 40 (which will be referred to hereinbelow as the index number) and the coordinate corresponding to the index position (hereinbelow, the rotary position coordinate) in association with each other. By referring to the index position and the rotary position coordinate, it is possible to index a grip 40 that holds a desired tool T.

As shown in FIG. 2A, the four tools T1 to T4 are positioned at 90°, 180°, 270°, and 360° (0°), respectively, with the angle of the uppermost position set at the reference (0°). That is, the weights of the four tools T1 to T4 are distributed substantially in balance with respect to the rotary shaft 32, and the center of gravity of the turret 30 is on the rotary shaft 32 or close to the rotary shaft 32. It is assumed in this state that the power switch 24 is switched from the on-state to the off-state and the excitation of the turret driving motor 34 is cut by force.

As shown in FIG. 2B, when the weights of the four tools T1 to T4 are distributed substantially in balance, no or slight force to turn the turret 30 acts thereon, the turret 30 remains at the same rotary position as shown in FIG. 2A. For example, when the rotary position of the turret 30 corresponding to the tool T1 is defined as a reference position Pr, the current position Pc of the turret 30 coincides with the reference position Pr.

Figure 3A:
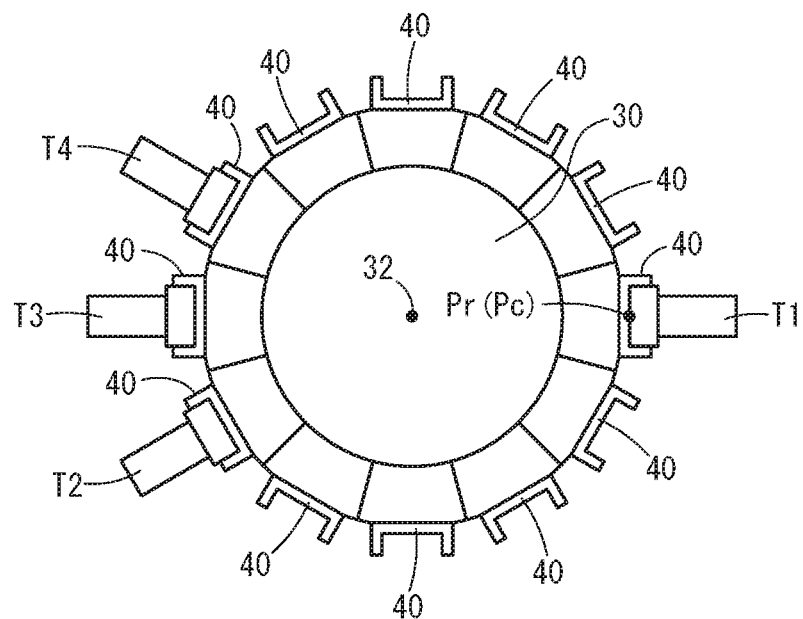
FIGS. 3A and 3B are diagrams showing a second transition of a temporal change in the rotary position of a turret.
Figure 3B:
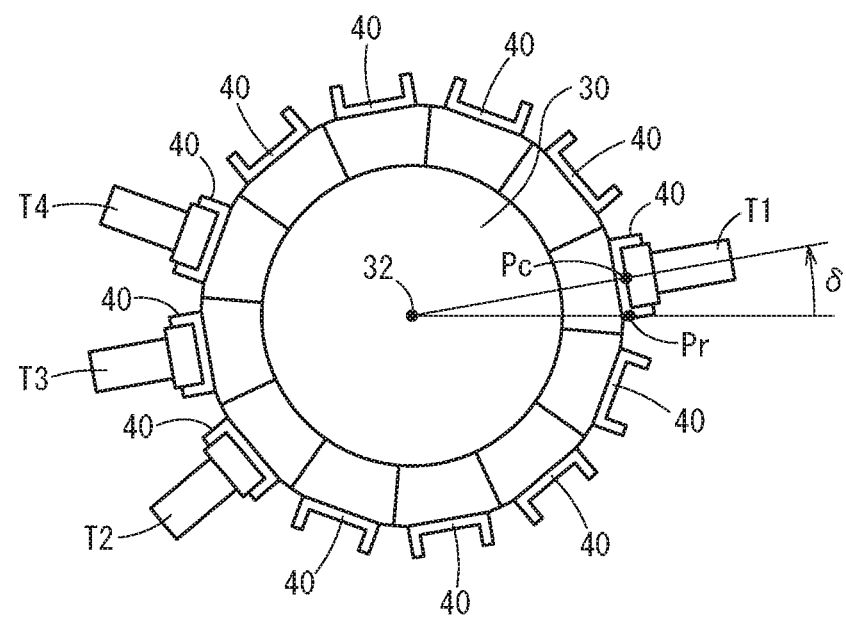

FIGS. 3A and 3B are diagrams showing a second transition of a temporal change in the rotary position of a turret 30. More specifically, FIG. 3A shows the rotary position of the turret 30 with the power switch 24 in the on-state. FIG. 3B shows the rotary position of the turret 30 immediately after turning off the power switch 24 from the positional state shown in FIG. 3A.

As shown in FIG. 3A, the four tools T1 to T4 are positioned at 90°, 240°, 270°, and 300°, respectively, with the angle of the uppermost position set at the reference) (0°). That is, the weight distribution of the four tools T1 to T4 is largely biased to the left side (270°) with respect to the rotary shaft 32, and the center of gravity of the turret 30 is located away from the rotary shaft 32. It is assumed in this state that the power switch 24 is switched from the on-state to the off-state and the excitation of the turret driving motor 34 is cut by force.

As shown in FIG. 3B, when the weight distribution of the four tools T1 to T4 is biased, a force lowering the center of gravity of the turret 30, or a force turning the turret 30 counterclockwise arises, so that the turret 30 is displaced by a rotational deviation δ from the reference position Pr shown in FIG. 3A. In this way, when the tool changer 12 is operated under the condition that a rotational deviation δ that is not negligible occurs at the time of switching the state of the power source 28, there is a risk that replacement of the tools T1 to T4 fails or impacts act on the spindle 20 of the machine tool 14.

In order to deal with the occurrence of the rotational deviation δ of the turret 30 due to some action on the turret driving motor 34, a method (hereinafter, referred to as "rotational compensation") for compensating the rotary position of the turret 30 using the machine tool system 10 will be proposed next.

<Operation of Machine Tool System 10>

The machine tool system 10 in the first embodiment is configured as described above. Next, the operation of the machine tool system 10, specifically the rotational compensation, will be described with reference to the flowchart of FIG. 4. Prior to this rotational compensation, the rotary position coordinate corresponding to the index position of each grip 40 is stored in the storage unit 58 as the coordinate indicating the reference position Pr of the turret 30.

Figure 4:
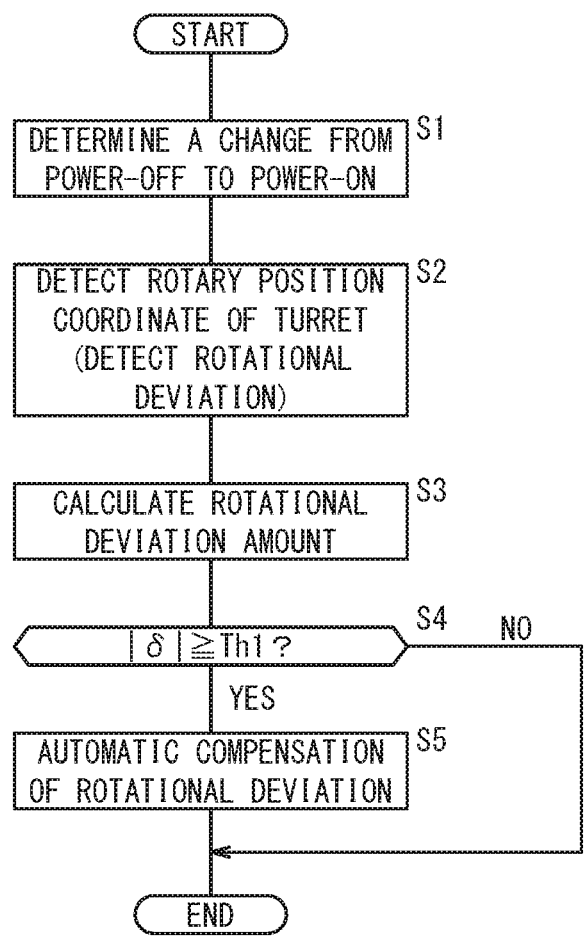
FIG. 4 is a flowchart for explaining the operation of a machine tool system of FIG. 1.

At step S1 in FIG. 4, the power status determiner 64 determines occurrence of the on/off state of power supply to the turret driving motor 34. In this case, the power status determiner 64 determines that the state of the power switch 24 has changed from "off" to "on".

At step S2, the encoder 38 detects the rotary position coordinate indicating the current position Pc of the turret 30 immediately after determination of occurrence of a particular switching at step S1 (in other words, the rotational deviation δ from the reference position Pr is detected). More specifically, the encoder 38 outputs a signal obtained from the turret driving motor 34 to the servo amplifier 54.

Here, "immediately after determination" may be a time period from the point of time of actual determination until the turret driving motor 34 starts driving. The reference position Pr corresponds to the rotary position of the turret 30 immediately before switching of the power switch 24 from the on-state to the off-state (after the turret driving motor 34 was driven last).

At step S3, the rotational deviation calculator 66 calculates the magnitude of the rotational deviation δ (hereinafter referred to as rotational deviation amount |δ|), using the rotary position coordinate of the turret 30 detected at step S2. Specifically, the rotational deviation calculator 66 reads out position data 62 stored in the storage unit 58 to acquire the rotary position coordinate representing the reference position Pr, and calculate the rotational deviation amount |δ| corresponding to the error of the current position Pc from the reference position Pr.

At step S4, the compensation necessity determiner 68 determines whether or not it is necessary to perform rotational compensation to return the turret 30 to the reference position Pr, based on the magnitude relationship between the rotational deviation amount |δ| calculated at step S3 and the preset threshold Th1. Specifically, the compensation necessity determiner 68 determines that rotational compensation is "necessary" when the relationship |δ|≥Th1 holds (step S4: YES) and the control goes to the next step (S5). On the other hand, when the relationship |δ|<Th1 holds (step S4: NO), the compensation necessity determiner 68 determines that rotational compensation is "unnecessary" and the control skips the step S5.

When the rotational compensation is needed, the machine tool system 10 performs automatic compensation of the rotational deviation δ at step S5. Specifically, the compensation commanding part 70 instructs the axis control circuit 52 to perform an operation of returning the turret 30 from the current position Pc to the reference position Pr. Thereafter, the servo amplifier 54 receives a command from the axis control circuit 52 and performs drive control for turning the turret driving motor 34 by a compensation amount (−δ) that cancels the rotational deviation δ. As a result, the rotational deviation δ is eliminated so that the turret 30 is always positioned with its deviation smaller than the given allowance (here, the threshold Th1).

<Preparation Methods of Position Data 62>

Next, the preparation methods of the position data 62 representing the reference position Pr will be described. It goes without saying that the methods shown below can be applied to not only the first embodiment but also to the following embodiments (the second and third embodiments) in a similar manner.

—First Preparation Method—

First, a first method of preparing the position data 62 will be described. For example, in the case where the turret 30 is always returned to a fixed position the machine tool 14 is shut down, the position data 62 indicating the aforementioned fixed position has been stored in the storage unit 58. In this case, the compensation necessity determiner 68 may determine whether or not the rotational compensation is necessary, using the initial position of the turret 30 specified by the position data 62 as the reference position Pr.

—Second Preparation Method—

Next, a second method of preparing the position data 62 will be described. While, for example, the power source 28 is in the ON state, the non-volatile storage unit 58 successively overwrites the rotary position coordinate representing the reference position Pr of the turret 30. Then, when the power source 28 has been temporarily turned off, the compensation necessity determiner 68 specifies the reference position Pr from the rotational position coordinate (i.e., the position at which the turret 30 was set last) loaded from the storage unit 58 immediately after the power source 28 is switched from the off-state to the on-state, and determines whether or not a rotational compensation is necessary based on that reference position. This method makes it possible to set the tool changer 12 within a suitable positional range even when an unexpected shutdown of power supply (e.g., electric outage) occurs.

Effect of First Embodiment

As described above, the machine tool system 10 is a position compensation system of a tool changer 12 including: [1] a turret 30 in which a plurality of grips 40 capable of holding tools T to be attached to a spindle 20 of a machine tool 14 are arranged along the circumferential direction; and [2] a turret driving motor (rotary driver) 34 for rotationally driving the turret 30 about a rotary shaft 32 to index an arbitrary one of the grips 40.

This machine tool system 10 further includes: [3] a storage unit 58 for storing a rotary position coordinate of the turret 30 corresponding to the index position of the grip 40 as a coordinate representing a reference position Pr of the turret 30; [4] an encoder 38 (rotary position coordinate detector) for detecting the rotary position coordinate of the turret 30; [5] a compensation necessity determiner 68 that determines whether or not it is necessary to perform a rotational compensation to return the turret 30 to the reference position Pr, in accordance with a rotational deviation δ of the detected rotary position coordinate of the turret 30 from the stored rotary position coordinate; and [6] a compensation request part for requesting an operation or work related to the rotational compensation when it is determined that the rotational compensation is necessary.

The method of compensating the position of the tool changer 12 includes: [1] a storing step of storing a rotary position coordinate of the turret 30 corresponding to the index position of the grip 40 as a coordinate representing a reference position Pr of the turret 30; [2] a detecting step (S2) of detecting the rotary position coordinate of the turret 30; [3] a determining step (S4) of determining whether or not it is necessary to perform a rotational compensation to return the turret 30 to the reference position Pr, in accordance with a rotational deviation δ of the detected rotary position coordinate of the turret 30 from the stored rotary position coordinate of the turret 30; and [4] a requesting step (S5) of requesting an operation or work related to the rotational compensation when it is determined that the rotational compensation is necessary.

In this manner, whether or not it is necessary to perform a rotational compensation to return the turret 30 to the reference position Pr in accordance with the rotational deviation δ of the detected rotary position coordinate from the stored rotary position coordinate is determined, it is therefore possible to always set the turret 30 at a suitable rotary position after starting or restarting the operation of the tool changer 12 including the turret driving motor 34, regardless of whether or not the turret 30 has actually turned in the direction of lowering the center of gravity. As a result, even if some action has exerted on the turret driving motor 34 to cause a rotational deviation δ on the turret 30, it is possible to set the tool changer 12 within a suitable positional range without use of an extra braking mechanism to prevent the rotational deviation δ.

In particular, the machine tool system 10 may further include a power status determiner 64 for determining the on/off state of power supply to the turret driving motor 34 operated by electric power, and the compensation necessity determiner 68 may decide whether or not it is necessary to perform rotational compensation when the power status determiner 64 determines that power supply has been switched from the off-state to the on-state. This configuration is especially effective because the turret 30 becomes more likely to turn by being triggered by suspension of power supply to the turret driving motor 34.

Here, the compensation request part may be a compensation commanding part 70 that instructs the turret driving motor 34 to perform an operation of returning the turret 30 to the reference position Pr. Further, the compensation necessity determiner 68 may determine that rotational compensation is unnecessary when the rotational deviation amount |δ| is less than a threshold Th1 and may determine that rotational compensation is necessary when the rotational deviation amount |δ| is equal to or greater than the threshold Th1. Using automatic rotational compensation makes it possible to always set the rotational deviation δ of the turret 30 smaller than a given allowance (that is, the threshold Th1).

Second Embodiment

Figure 5:
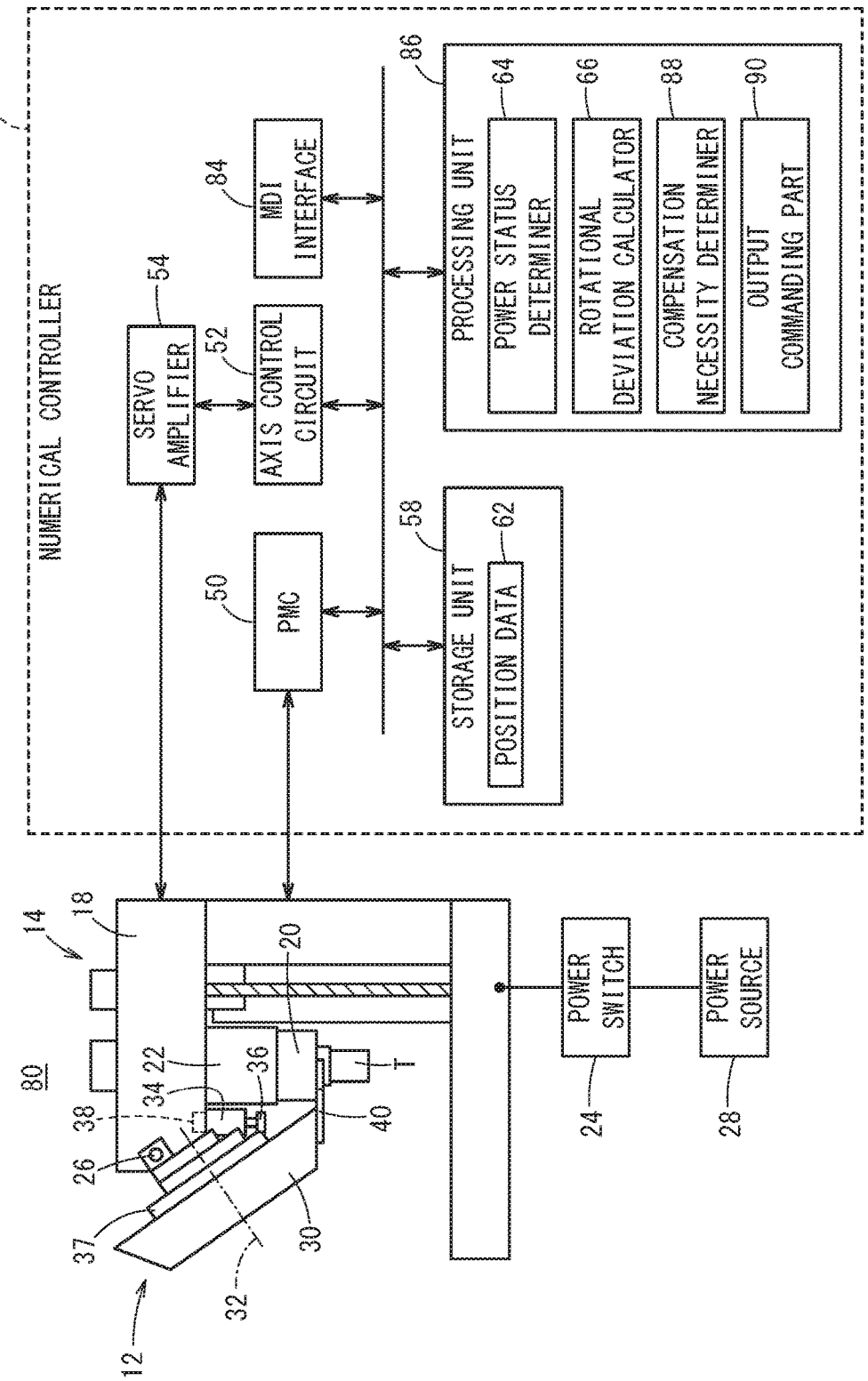
FIG. 5 is an overall configuration diagram of a machine tool system as a position compensation system in the second embodiment of the present invention.
Figure 6:
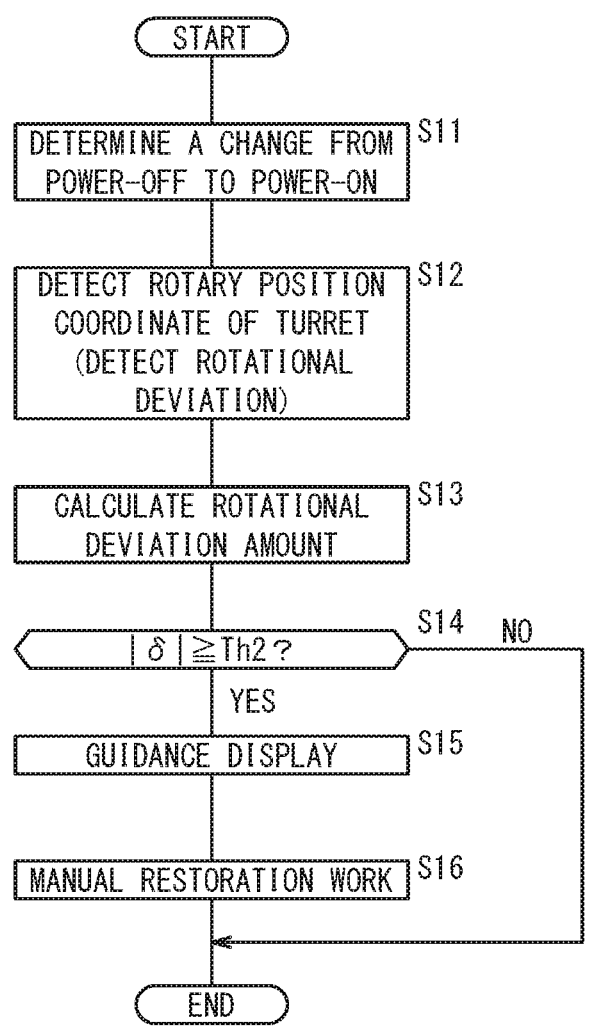
FIG. 6 is a flowchart for explaining the operation of a machine tool system of FIG. 5.

Referring next to FIGS. 5 and 6, a position compensation system according to the second embodiment will be described. Here, the same components as those in the first embodiment (machine tool system 10) are allotted with the same reference numerals, and description of those configurations may be omitted.

<Configuration of Machine Tool System 80>

FIG. 5 is an overall configuration diagram of a machine tool system 80 as a position compensation system according to a second embodiment of the present invention. The machine tool system 80 includes a machine tool 14 having a tool changer 12 and a numerical controller 82 for controlling the machine tool 14 using a machining program. The machine tool 14 basically has the same configuration as that of the first embodiment.

The numerical controller 82 is a computer that, in addition to the PMC 50, the axis control circuit 52, the servo amplifier 54 and the storage unit 58, includes an MDI interface 84 (notifier/compensation request part) different in configuration or function from the first embodiment, and a processing unit 86.

The MDI interface 84 is composed of, for example, an input/output device including a keyboard, mouse, touch sensor, display, speaker, and is configured to be able to input and output multiple forms of driving information relating to the operation of the machine tool system 80. Specifically, the MDI interface 84 can display an aftermentioned screen of restoration guidance for the implementation of rotational compensation and also output a warning sound for urging the operator to perform the rotational compensation.

Like the first embodiment (processing unit 60), the processing unit 86 is configured of a processor such as a CPU or MPU. In the processing unit 86, the processor reads out the program from the storage unit 58 and runs the program to thereby enable execution of the individual functions of the power status determiner 64, the rotational deviation calculator 66, a compensation necessity determiner 88, and an output commanding part 90.

<Operation of Machine Tool System 80>

The machine tool system 80 in the second embodiment is thus configured. Referring next to the flowchart of FIG. 6, the operation (specifically, rotational compensation) of the machine tool system 80 will be described focusing on features different from those of the first embodiment (FIG. 4).

As shown in FIG. 6, the power status determiner 64 determines whether the power supply to the turret driving motor 34 is in the on-state or off-state (step S11), as in step S1. As in step S2, the encoder 38 detects the rotary position coordinate indicating the current position Pc of the turret 30, i.e., the rotational deviation δ from the reference position Pr (step S12). As in step S3, the rotational deviation calculator 66 calculates the rotational deviation amount |δ|, based on the detected rotary position coordinate and the stored rotary position coordinate (step S13).

At step S14, the compensation necessity determiner 88 determines whether or not it is necessary to perform rotational compensation to return the turret 30 to the reference position Pr, based on the magnitude relationship between the rotational deviation amount |δ| calculated at step S13 and a preset threshold Th2. Specifically, the compensation necessity determiner 88 determines that rotational compensation is "necessary" when the relationship |δ|≥Th2 holds (step S14: YES) and the control goes to the next step (S15). On the other hand, when the relationship |δ|<Th2 holds (step S14: NO), the compensation necessity determiner 88 determines that rotational compensation is "unnecessary" and the control skips the steps S15 and S16.

When the rotational compensation is needed, the MDI interface 84 performs guidance display for notifying the operator that the work of returning the turret 30 to the reference position Pr is performed at step S15. Specifically, the output commanding part 90 outputs display data for a restoration guidance screen of the work toward the MDI interface 84. In response to this, the MDI interface 84 displays a restoring guidance screen (including, for example, the content of the rotational deviation δ or the compensation amount (−δ)) for guiding the implementation of rotational compensation in a predetermined display area. Alternatively, the MDI interface 84 may issue a warning sound to prompt the operator to implement rotational compensation in response to the output command from the output commanding part 90.

At step S16, the operator performs manual restoring work (that is, manual compensation of the rotational deviation δ)

in accordance with the guidance display at step S15. For example, after confirming the displayed rotational deviation δ or the compensation amount (−δ), the operator returns the position of the turret 30 by hand (manual operation). As a result, the rotational deviation δ of the turret 30 is eliminated so that the turret is always positioned with its deviation smaller than the given allowance (here, the threshold Th2).

Effect of Second Embodiment

As described above, the machine tool system 80 is a position compensation system of a tool changer 12 including: [1] a turret 30 in which a plurality of grips 40 capable of holding tools T to be attached to a spindle 20 of a machine tool 14 are arranged along the circumferential direction; and [2] a turret driving motor (rotary driver) 34 for rotationally driving the turret 30 about a rotary shaft 32 to index an arbitrary one of the grips 40.

This machine tool system 80 includes: [3] a storage unit 58 for storing a rotary position coordinate of the turret 30 corresponding to the index position of the grip 40 as a coordinate representing a reference position Pr of the turret 30, [4] an encoder 38 (rotary position coordinate detector) for detecting the rotary position coordinate of the turret 30; [5] a compensation necessity determiner 88 that determines whether or not it is necessary to perform a rotational compensation to return the turret 30 to the reference position Pr, in accordance with a rotational deviation δ of the detected rotary position coordinate of the turret 30 from the stored rotary position coordinate; and [6] a compensation request part for requesting an operation or work related to the rotational compensation when it is determined that the rotational compensation is necessary.

The method of compensating the position of the tool changer 12 includes: [1] a storing step of storing a rotary position coordinate of the turret 30 corresponding to the index position of the grip 40 as a coordinate representing a reference position Pr of the turret 30; [2] a detecting step (S12) of detecting the rotary position coordinate of the turret 30; [3] a determining step (S14) of determining whether or not it is necessary to perform a rotational compensation to return the turret 30 to the reference position Pr, in accordance with a rotational deviation δ of the detected rotary position coordinate of the turret 30 from the stored rotary position coordinate of the turret 30; and [4] a requesting step (S15) of requesting an operation or work related to the rotational compensation when it is determined that the rotational compensation is necessary.

With this configuration, the same operation and effect as in the case of the first embodiment (machine tool system 10) can be obtained. More explicitly, even if some action has exerted on the turret driving motor 34 to cause a rotational deviation δ on the turret 30, it is possible to set the tool changer 12 within a suitable positional range without use of an extra braking mechanism to prevent rotational deviation δ.

Here, the compensation request part may be an MDI interface 84 (notifier) that notifies the operator to perform the work of returning the turret 30 to the reference position Pr. Further, the compensation necessity determiner 88 may determine that rotational compensation is unnecessary when the rotational deviation amount |δ| is less than a threshold Th2 and may determine that rotational compensation is necessary when the rotational deviation amount |δ| is equal to or greater than the threshold Th2. Using manual rotational compensation makes it possible to always set the rotational deviation δ of the turret 30 smaller than a given allowance (that is, the threshold Th2).

Third Embodiment

Figure 7:
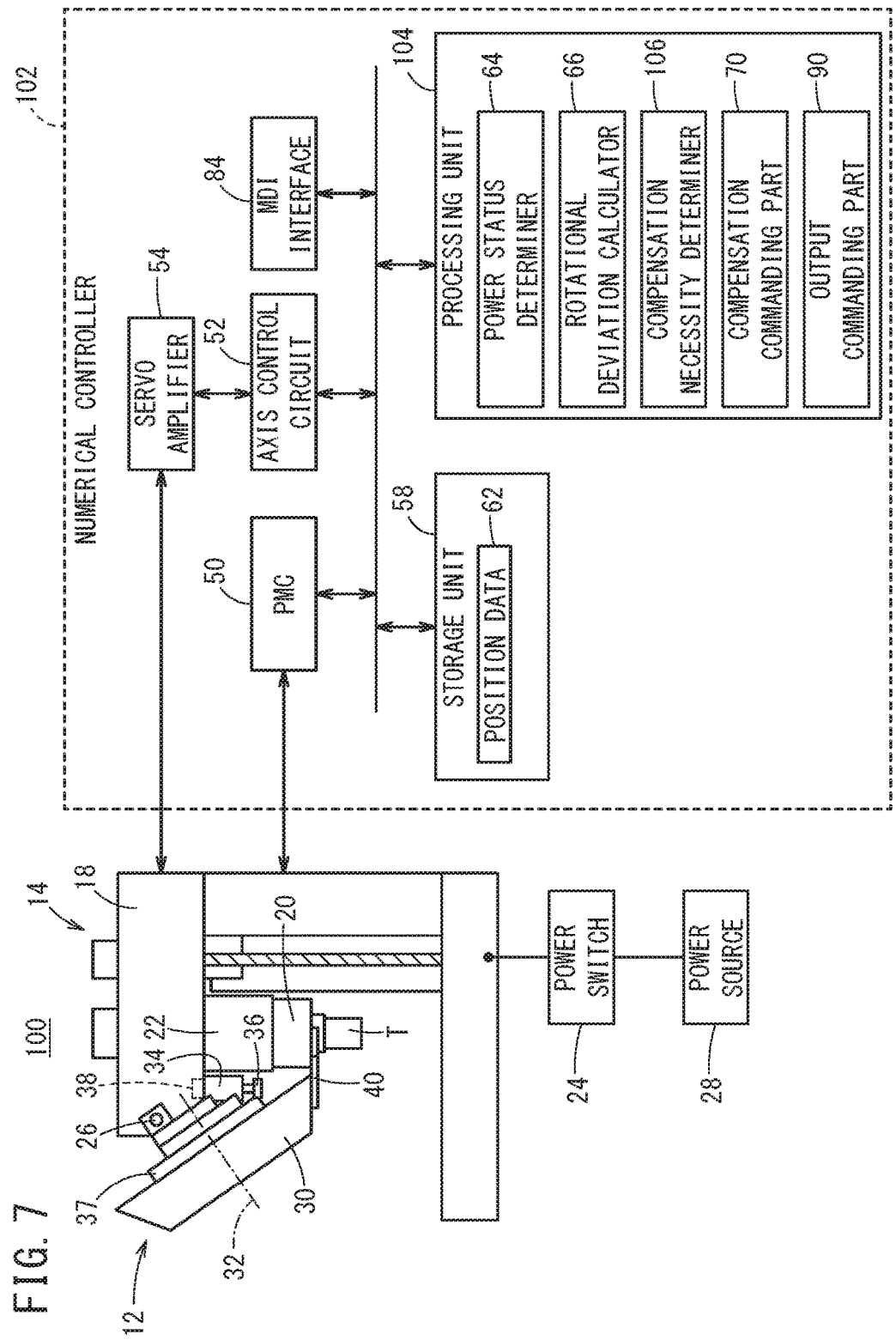
FIG. 7 is an overall configuration diagram of a machine tool system as a position compensation system in the third embodiment of the present invention.
Figure 8:
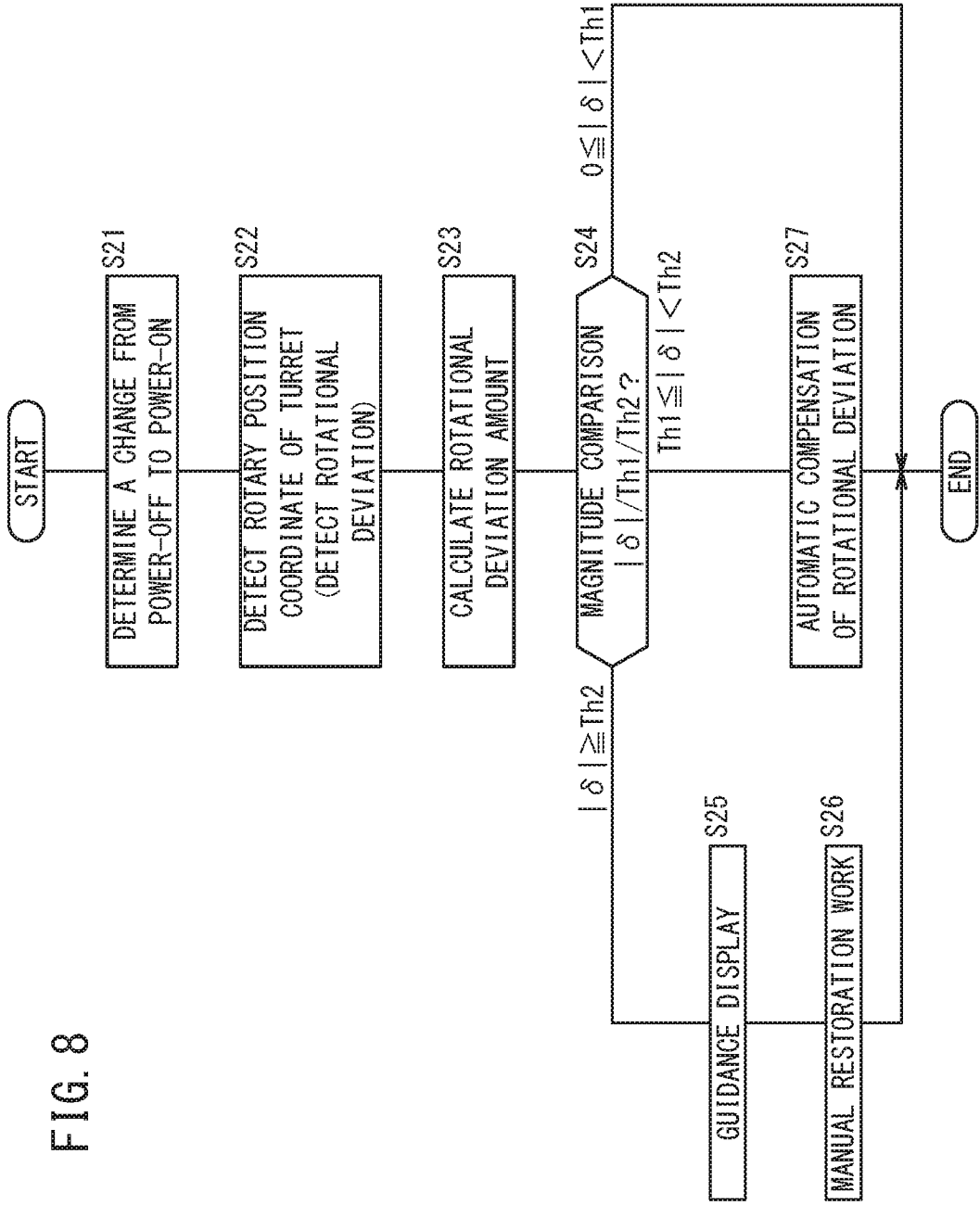
FIG. 8 is a flowchart for explaining the operation of a machine tool system of FIG. 7.

Referring next to FIGS. 7 and 8, the position compensation system according to the third embodiment will be described. Here, the same components as those in the first embodiment (machine tool system 10) or the second embodiment (machine tool system 80) are allotted with the same reference numerals, and description of those configurations may be omitted.

<Configuration of Machine Tool System 100>

FIG. 7 is an overall configuration diagram of a machine tool system 100 as a position compensation system according to a third embodiment of the present invention. The machine tool system 100 includes a machine tool 14 having a tool changer 12 and a numerical controller 102 for controlling the machine tool 14 using a machining program. The machine tool 14 basically has the same configuration as in the case of the first embodiment.

The numerical controller 102 is a computer including, in addition to the PMC 50, the axis control circuit 52, the servo amplifier 54, the storage unit 58 and the MDI interface 84, a processing unit 104 having a configuration or functions different from those of the first embodiment.

Like the first embodiment (processing unit 60), the processing unit 104 is configured of a processor such as a CPU or MPU. In the processing unit 104, the processor reads out the program from the storage unit 58 and runs the program to thereby enable execution of the individual functions of the power status determiner 64, the rotational deviation calculator 66, a compensation necessity determiner 106, the compensation commanding part 70, and an output commanding part 90.

<Operation of Machine Tool System 100>

The machine tool system 100 according to the third embodiment is configured as described above. Referring next to the flowchart in FIG. 8, the operation of the machine tool system 100 (specifically, rotational compensation) will be described, mainly focusing on features different from those of the first embodiment (FIG. 4).

As shown in FIG. 8, the power status determiner 64 determines whether the power supply to the turret driving motor 34 is in the on-state or off-state (step S21) as in step S1. As in step S2, the encoder 38 detects the rotary position coordinate indicating the current position Pc of the turret 30, i.e., the rotational deviation δ from the reference position Pr (step S22). As in step S3, the rotational deviation calculator 66 calculates the rotational deviation amount |δ|, based on the detected rotary position coordinate and the stored rotary position coordinate (step S23).

At step S24, the compensation necessity determiner 106 determines whether or not it is necessary to perform rotational compensation to return the turret 30 to the reference position Pr, based on the magnitude relationship among the rotational deviation amount |δ| calculated at step S23, a preset threshold Th1 (first threshold) and a preset threshold Th2 (second threshold). Here, it is assumed that 0<Th1<Th2 is satisfied.

Specifically, when the relationship |δ|≥Th2 holds (|δ|≥Th2 at step S24), the compensation necessity determiner 106 determines that rotational compensation by hand (manual operation) is "necessary", the control goes to the next steps S25 and S26. In response to the command from the output commanding part 90, the MDI interface 84 performs guidance display for prompting the operator to return the turret 30 to the reference position Pr (step S25). Then, the operator performs manual restoring work (manual compensation of the rotational deviation δ) according to the guidance display at step S25 (step S26).

Further, when the relationship: Th1≤|δ|<Th2 holds (step S24: Th1≤|δ|<Th2), the compensation necessity determiner 106 determines that automatic rotational compensation is "necessary", the control proceeds to the next step S27. In accordance with the command from the compensation commanding part 70, the machine tool system 100 automatically compensates the rotational deviation δ (step S27).

On the other hand, when the relationship: 0≤|δ|<Th1 holds (step S24: 0≤|δ|<Th1), the compensation necessity determiner 106 determines that rotational compensation is "unnecessary", the control skips the steps S25 to S27.

Effects of Third Embodiment

As described above, the machine tool system 100 is a position compensation system of a tool changer 12 including: [1] a turret 30 in which a plurality of grips 40 capable of holding tools T to be attached to a spindle 20 of a machine tool 14 are arranged along the circumferential direction; and [2] a turret driving motor (rotary driver) 34 for rotationally driving the turret 30 about a rotary shaft 32 to index an arbitrary one of the grips 40.

This machine tool system 100 further includes: [3] a storage unit 58 for storing a rotary position coordinate of the turret 30 corresponding to the index position of the grip 40 as a coordinate representing a reference position Pr of the turret 30; [4] an encoder 38 (rotary position coordinate detector) for detecting the rotary position coordinate of the turret 30; [5] a compensation necessity determiner 106 that determines whether or not it is necessary to perform a rotational compensation to return the turret 30 to the reference position Pr, in accordance with a rotational deviation δ of the detected rotary position coordinate of the turret 30 from the stored rotary position coordinate; and [6] a compensation request part for requesting an operation or work related to the rotational compensation when it is determined that the rotational compensation is necessary.

The method of compensating the position of the tool changer 12 includes: [1] a storing step of storing a rotary position coordinate of the turret 30 corresponding to the index position of the grip 40 as a coordinate representing a reference position Pr of the turret 30; [2] a detecting step (S22) of detecting the rotary position coordinate of the turret 30; [3] a determining step (S24) of determining whether or not it is necessary to perform a rotational compensation to return the turret 30 to the reference position Pr, in accordance with a rotational deviation δ of the detected rotary position coordinate of the turret 30 from the stored rotary position coordinate of the turret 30; and [4] requesting steps (S25, S27) of requesting an operation or work related to the rotational compensation when it is determined that the rotational compensation is necessary.

With this configuration, the same operation and effect as in the case of the first embodiment (machine tool system 10) can be obtained. More explicitly, even if some action has exerted on the turret driving motor 34 to cause a rotational deviation δ on the turret 30, it is possible to set the tool changer 12 within a suitable positional range without use of an extra braking mechanism to prevent rotational deviation δ.

Here, the compensation request part may function as: (a) a compensation commanding part 70 that instructs the turret driving motor 34 to perform an operation of returning the turret 30 to the reference position Pr; and (b) an MDI interface 84 (notifier) that notifies the operator to perform the work of returning the turret 30 to the reference position Pr. Further, the compensation necessity determiner 106 may determine that: (1) the rotational compensation is unnecessary when the rotational deviation amount |δ| is less than a first threshold Th1; (2) the rotational compensation accompanied by a notification from the MDI interface 84 is necessary when the rotational deviation amount |δ| is equal to or greater than a second threshold Th2 (>Th1); and (3) the rotational compensation accompanied by the command from the compensation commanding part 70 is necessary when the rotational deviation amount |δ| is equal to or greater than the first threshold Th1 and less than the second threshold Th2. Thus, use of different methods, either automatic compensation or manual compensation depending on the magnitude of the rotational deviation δ of the turret 30, makes it possible to achieve flexible rotational compensation.

[Remarks]

It should be noted that the present invention is not limited to the above-described embodiments, but can be freely changed without departing from the gist of the present invention. Alternatively, each of configurations may be arbitrarily combined with others as long as no technical inconsistency occurs.

What is claimed is:

1. A position compensation system of a tool changer including a turret in which a plurality of grips capable of holding tools to be attached to a spindle of a machine tool are arranged along a circumferential direction, and a rotary driver that rotationally drives the turret about a rotary shaft to index an arbitrary one of the grips, the position compensation system comprising:
a storage unit configured to store a reference rotary position coordinate of the turret corresponding to an index position of one of the grips as a coordinate representing a reference position of the turret;
a rotary position coordinate detector configured to detect a rotary position coordinate of the turret;
a compensation necessity determiner configured to determine whether or not it is necessary to perform a rotational compensation to return the turret to the reference position, in accordance with a rotational deviation of the rotary position coordinate of the turret detected by the rotary position coordinate detector from the reference rotary position coordinate of the turret stored in the storage unit; and
a compensation request part configured to request an operation or work related to the rotational compensation when the compensation necessity determiner determines that the rotational compensation needs to be performed.

2. The position compensation system according to claim 1, further comprising a power status determiner configured to determine an on-state or an off-state of power supply to the rotary driver, which rotary driver is operated by electric power, wherein the compensation necessity determiner is configured to determine whether or not it is necessary to perform a rotational compensation when the power status determiner determines that power supply has been switched from the off-state to the on-state.

3. The position compensation system according to claim 1, wherein the compensation request part is a compensation commanding part configured to instruct the rotary driver to perform an operation of returning the turret to the reference position.

4. The position compensation system according to claim 3, wherein the compensation necessity determiner is configured to determine that the rotational compensation is unnecessary when a magnitude of the rotational deviation is less than a threshold and that the rotational compensation needs to be done when the magnitude of the rotational deviation is equal to or greater than the threshold.

5. The position compensation system according to claim 1, wherein the compensation request part is a notifier configured to notify an operator to perform the work of returning the turret to the reference position.

6. The position compensation system according to claim 5, wherein the compensation necessity determiner is configured to determine that the rotational compensation is unnecessary when a magnitude of the rotational deviation is less than a threshold and that the rotational compensation needs to be done when the magnitude of the rotational deviation is equal to or greater than the threshold.

7. The position compensation system according to claim 1, wherein:

the compensation request part is configured to function as a compensation commanding part that instructs the rotary driver to perform the operation of returning the turret to the reference position and as a notifier that notifies an operator to perform the work of returning the turret to the reference position; and, the compensation necessity determiner is configured to determine that the rotational compensation is unnecessary when a magnitude of the rotational deviation is less than a first threshold, that the rotational compensation accompanied by a notification from the notifier is necessary when the magnitude of the rotational deviation is equal to or greater than a second threshold that is greater than the first threshold, and that the rotational compensation accompanied by a command from the compensation commanding part is necessary when the magnitude of the rotational deviation is equal to or greater than the first threshold and less than the second threshold.

* * * * *